United States Patent
Mizukoshi et al.

(10) Patent No.: US 10,358,052 B1
(45) Date of Patent: Jul. 23, 2019

(54) SEAT LIFTER STRUCTURE AND VEHICLE SEAT EQUIPPED WITH THE SAME

(71) Applicants: Adient Engineering and IP GmbH, Burscheid (DE); HONDA MOTOR CO., LTD., Tokyo (JP)

(72) Inventors: Toshimitsu Mizukoshi, Saitama (JP); Masaki Shimazu, Saitama (JP); Taiji Misono, Saitama (JP); Hiroyuki Yasui, Kanagawa (JP); Motohiko Ozawa, Kanagawa (JP); Thomas D Novitsky, Plymouth, MI (US)

(73) Assignees: ADIENT ENGINEERING AND IP GMBH, Burscheid (DE); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/923,498

(22) Filed: Mar. 16, 2018

(51) Int. Cl.
 *B60N 2/16* (2006.01)
(52) U.S. Cl.
 CPC ........... *B60N 2/1615* (2013.01); *B60N 2/165* (2013.01); *B60N 2/1655* (2013.01); *B60N 2/1695* (2013.01); *B60N 2/168* (2013.01)
(58) Field of Classification Search
 CPC .... B60N 2/167; B60N 2/1615; B60N 2/1655; B60N 2/1695
 See application file for complete search history.

(56) References Cited

U.S. PATENT DOCUMENTS

| | | | | |
|---|---|---|---|---|
| 2001/0035673 A1* | 11/2001 | Lepaule | ................ | B60N 2/1615 297/338 |
| 2005/0023870 A1* | 2/2005 | Aufrere | ................ | B60N 2/1615 297/216.13 |
| 2006/0278774 A1* | 12/2006 | Garnier | ................ | B60N 2/2257 248/157 |
| 2013/0327609 A1* | 12/2013 | Kawai | ................... | F16D 41/105 192/16 |
| 2015/0246624 A1* | 9/2015 | Furuta | ................ | B29O 65/7829 297/344.15 |

(Continued)

FOREIGN PATENT DOCUMENTS

| | | | | |
|---|---|---|---|---|
| EP | 1813465 A2 * | 8/2007 | ........... | B60N 2/1615 |
| JP | 2007-202627 A | 8/2007 | | |
| JP | 5509917 B2 * | 6/2014 | ........... | B60N 2/1615 |

*Primary Examiner* — Timothy J Brindley
(74) *Attorney, Agent, or Firm* — McGlew and Tuttle, P.C.

(57) ABSTRACT

A seat lifter structure which can obtain a rotation of a sector with stable torques is provided. It is equipped with a sector (7) supported to be rotatable by a support member (21), arranged to be facing with a side frame (2) by being pinched and fixed by a pair of expanded portions (6a, 6b) of a tubular shaft member (6) that is supported to be rotatable by the side frame (2), and rotating along the side frame (2) at a time of raising or lowering the side frame (2); a ring shaped spacer (13) having a first ring shaped abutting surface (13da) facing with the sector (7) and having a first outer diameter ($\phi 13d2$), and a second ring shaped abutting surface (13ca) facing with the side frame (2) and having a second outer diameter ($\phi 13c2$) different from the first outer diameter ($\phi 13d2$), which is installed between the sector (7) and the side frame (2) with an axial line (CL6) as a center; and a biasing member (12) that biases and abuts the sector (7) to the first abutting surface (13da) and biases and abuts the side frame (2) to the second abutting surface (13ca) by biasing the sector (7) and the side frame (2) to approach.

4 Claims, 5 Drawing Sheets

(56) References Cited

U.S. PATENT DOCUMENTS

| | | | |
|---|---|---|---|
| 2015/0336477 A1* | 11/2015 | Matsui | B60N 2/682 297/344.15 |
| 2017/0028890 A1* | 2/2017 | Matsui | B60N 2/68 |
| 2018/0222356 A1* | 8/2018 | Ishihara | B60N 2/54 |

* cited by examiner

SEAT LIFTER STRUCTURE AND VEHICLE SEAT EQUIPPED WITH THE SAME

FIELD OF THE INVENTION

The present invention relates to a seat lifter structure and a vehicle seat equipped with the same.

BACKGROUND OF THE INVENTION

As described in the Patent Document 1, in a seat lifter for raising or lowering a seat cushion that is provided on a vehicle seat, there is known a structure in which a sector is welded and fixed to a tubular shaft member inserted into bearing holes of a pair of side panels via bushings to be freely rotatable.

Also, with respect to this structure, outwardly fitting a ring shaped spacer to the tubular shaft member between the sector and the side panel, while adding a structure for biasing the tubular shaft member in a direction for making the sector and the side panel to approach is also carried out to generate torques (a static torque and a dynamic torque) by sliding friction forces between the spacer and the sector and bushings, that are caused by a rotation of the sector in conjunction with a lifting operation.

Patent Document 1: Japanese Patent Application Publication No. 2007-202627

By the way, the conventional seat lifter structure was a structure where which one of the sector and the bushings is going to slide with the spacer is not determined when the sector is rotated by the operation of the lifter. For this reason, there was a room for improvement in that it is hard to stabilize the torques (a static torque and a dynamic torque) at a time of rotating the sector.

On the other hand, thinning of the tubular shaft member is also discussed in conjunction with making the seat lightweighted. However, when the tubular shaft member is thinned, the welding of the sector becomes difficult, so that it was necessary to fix the sector to the tubular shaft member by a method other than the welding.

For this reason, it has been expected that the improvement to stabilize torques at a time of rotating the sector is realized in a structure for fixing the sector to the tubular shaft member by a method other than the welding.

SUMMARY OF THE INVENTION

Therefore, the present invention has an object of providing a seat lifter structure and a vehicle seat equipped with the same, which can obtain a rotation of a sector fixed to a shaft member by a method other than welding, with stable torques.

In order to achieve the above noted object, the present invention has the following structure.

1) A seat lifter structure for raising or lowering a cushion seat by raising or lowering a side frame provided on the cushion seat with respect to a support member, the seat lifter structure having:
   a sector supported to be rotatable by said support member, arranged to be facing with said side frame by being pinched and fixed by a pair of flange like expanded portions formed on a tubular shaft member that is supported to be rotatable by said side frame, and rotating around an axial line of said tubular shaft member along said side frame at a time of raising or lowering said side frame;
   a ring shaped spacer having a first ring shaped abutting surface facing with said sector and having a first outer diameter, and a second ring shaped abutting surface facing with said side frame and having a second outer diameter different from said first outer diameter, which is installed in a first orientation between said sector and said side frame with an axial line of said tubular shaft member as a central axis; and
   a biasing member that biases and abuts said sector to said first abutting surface and biases and abuts said side frame to said second abutting surface by biasing said sector and said side frame in a direction of approaching.

2) The seat lifter structure as described in 1), wherein said spacer has a concave portion into which said flange like expanded portions are capable of entering without abutting, said flange like expanded portions are abutted to said spacer and it becomes impossible for said second abutting surface to abut to said sector, in a case of being installed in a reverse orientation in said axial line direction with respect to said first orientation.

3) A vehicle seat mounted on a vehicle and having a cushion seat and a seat back, wherein
   the vehicle seat is equipped with a seat lifter structure to be raised or lowered with respect to a movable rail supported on a fixed rail fixed to a floor of said vehicle, and said seat lifter structure is made to be the seat lifter structure as described in 1) or 2) with said movable rail as said support member.

According to the present invention, it is possible to obtain the effect that a rotation of a sector fixed to a shaft member by a method other than welding can be obtained, with stable torques.

DETAILED DESCRIPTION OF THE INVENTION

Schematic configurations of a seat lifter structure LK and a seat ST, which are practical examples of a seat lifter structure and a vehicle seat equipped with the same according to an embodiment of the present invention, will be explained with reference to FIG. 1.

Figure 1:
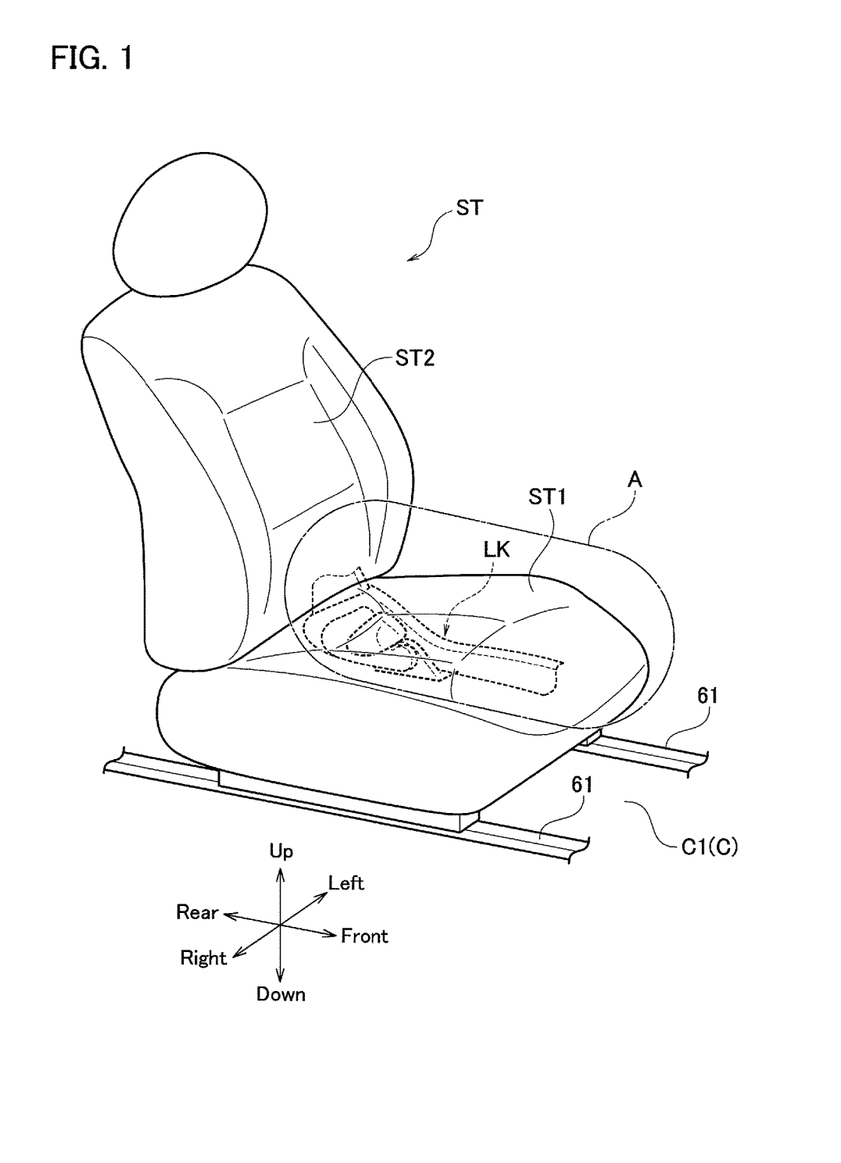
FIG. 1 is an outward appearance perspective view of a seat ST of a practical example of the present invention.

FIG. 1 is an outward appearance perspective view of the seat ST. In the following explanation, respective directions of front, rear, left, right, up and down will be defined based on a state in which the seat ST is mounted on a vehicle body C, by arrows shown in FIG. 1. A left and right direction will also be referred to as a width direction.

As shown in FIG. 1, the seat ST has a cushion seat ST1 and a seat back ST2.

The seat ST is attached to be capable of moving in a front and rear direction by a known sliding structure, with respect to a pair of rails 61, 61 as fixing members installed on a floor surface C1 of the vehicle body C of the vehicle.

The seat ST has the seat lifter structure LK for enabling the cushion seat ST1 and the seat back ST2 to be raised or lowered with respect to the floor surface C1. Next, this seat lifter structure LK will be explained with reference to FIG. 2.

Figure 2:
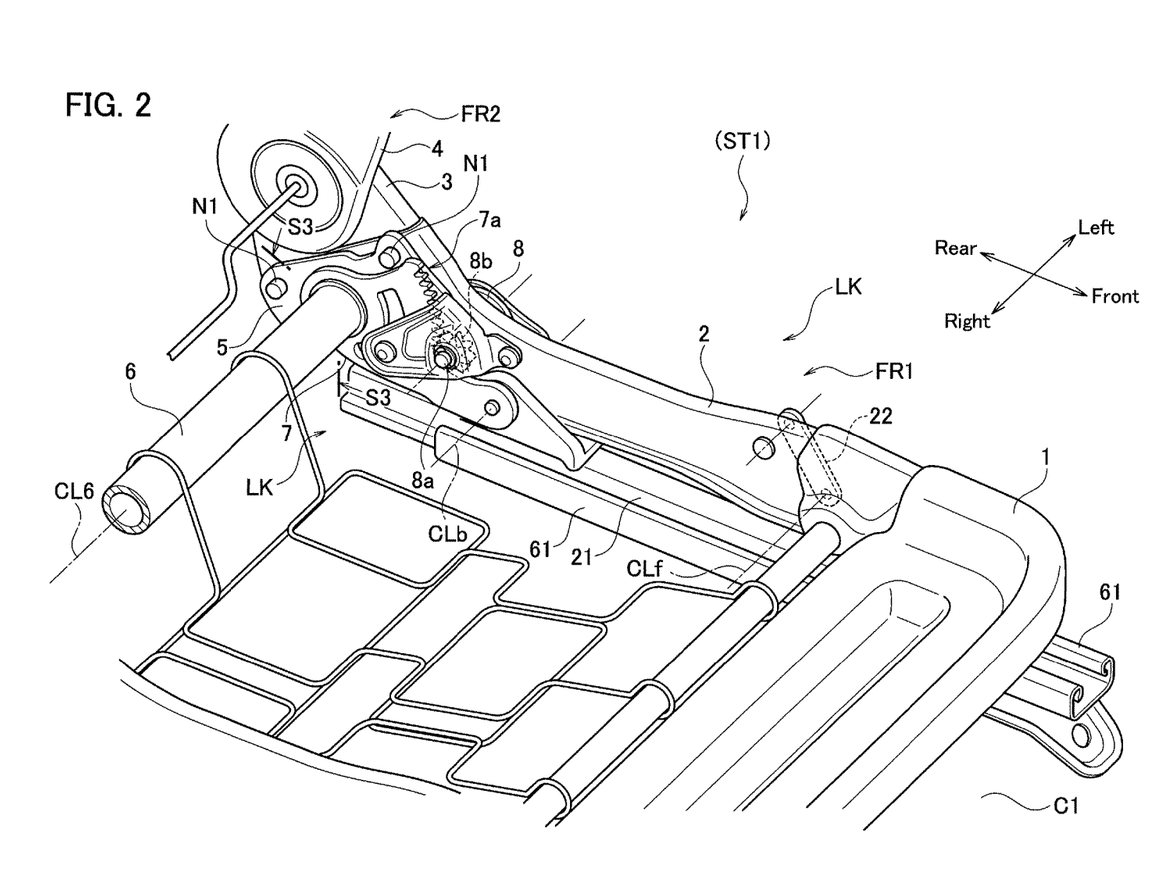
FIG. 2 is a diagram for explaining a seat lifter structure LK provided on the seat ST.

FIG. 2 is a diagram for explaining an internal frame structure at a portion A in FIG. 1, which is a perspective view looked from an almost identical viewpoint as FIG. 1. In FIG. 2, a left side will be an inner side of the seat, and a right side will be an outer side.

In FIG. 2, as a frame FR1 to be a framework provided on the cushion seat ST1, a part of a front frame 1 extending to left and right at a front portion of the cushion seat ST1, a left side frame 2 among a pair of side frames extending to a rear side from left and right ends of the front frame 1, and a relay panel 3 connected to a rear end portion of the side frame 2, are shown.

Also, as a frame FR2 to be a framework provided on the seat back ST2, a part of a seat back side frame 4 supported to be freely rotatable with respect to the relay panel 3 is shown.

On an inner side surface of a rear portion of the side frame 2, a joint plate 5 is attached by welding. The joint plate 5 and the relay panel 3 and the side frame 2 are fastened and integrated by a screw N1.

As already mentioned, on the floor surface C of the vehicle body, the rail 61 is fixed, and on the rail 61, a movable rail 21 is supported to be movable to front and rear.

The side frame 2 and the cushion seat ST1 having the side frame 2 are made to be raised or lowered with respect to the movable rail 21 as a support member for supporting the side frames 2 that are raised or lowered.

In detail, the side frame 2 has a front portion that is supported to be capable of rotating around an axial line CLf with respect to the movable rail 21 via a link bar 22.

Also, as for a rear portion, first of all, a sector 7 is provided to be capable of rotating around an axial line CLb, with respect to the movable rail 21. The sector 7 is fixed to a rear portion shaft 6 which is a tubular shaft member, and the rear portion shaft 6 is supported to be capable of rotating forward or reverse around an axial line CL6 with respect to the side frame 2.

Namely, the rear portion of the side frame 2 is supported to be capable of rotating and being raised or lowered around an axial line CLb via the rear portion shaft 6 with respect to the movable rail 21, as the sector 7 that is arranged to be facing with the side frame 2 rotates along the side frame 2 around the axial line CLb.

In this support structure, a gear portion 7a is provided on the sector 7, and the gear portion 7a is engaged with a pinion 8b coupled to a shaft portion 8a which is an output shaft of a brake unit 8 attached to the side frame.

The shaft portion 8a of the brake unit 8 rotates stepwise, as a passenger operates a lift operation mechanism not shown in the figure, for example.

Namely, as the shaft portion 8a rotates, the sector 7 and the rear portion shaft 6 will rotate around the axis line CLb via the pinion 8b, and the side frame 2 is raised.

The raised side frame 2 will be lowered by reversely rotating the pinion 8b.

Also, as an embodiment equipped with a lifting motor in which its output shaft is linked to the shaft portion 8a, the side frame 2 may be raised or lowered by forwardly or reversely rotating the shaft portion 8a by an operation of the lifting motor.

Next, a support portion structure for the sector 7 and the rear portion shaft 6 in the side frame 2 will be described in detail with references to FIG. 2 to FIG. 5.

Figure 3:
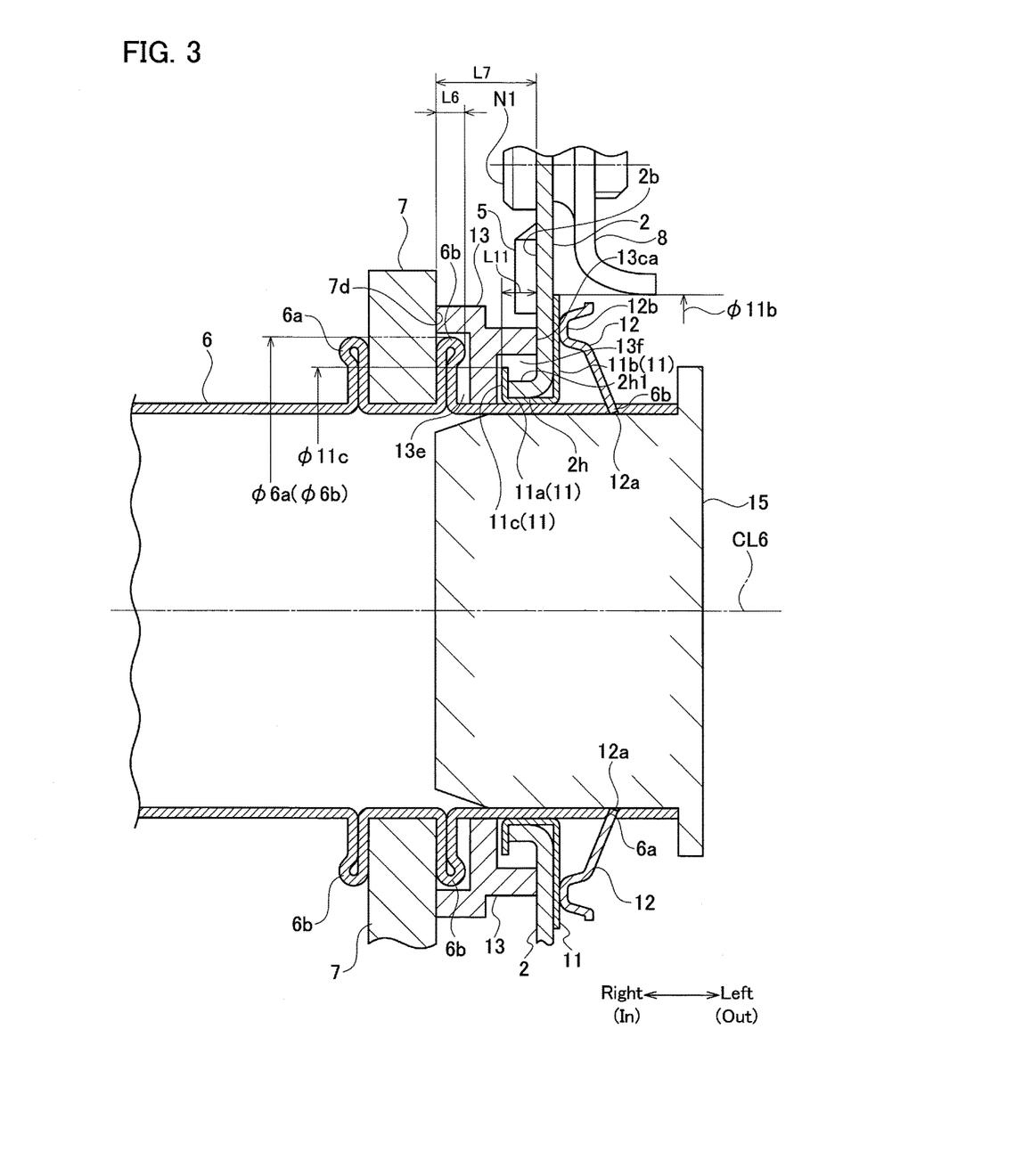
FIG. 3 is a cross sectional view at a S3-S3 position in FIG. 2.

As shown in FIG. 3 which is a cross sectional view at a S3-S3 position in FIG. 2, the side frame 2 has a support hole 2h accompanied with a protruding portion 2h1 that is formed to be convex on an inner side by a burring process.

A ring shaped bushing 11 made of metal is attached to the support hole 2h.

The bushing 11 is formed to be in an approximately C-shaped cross section, by having a ring shaped base portion 11a facing with a periphery of the rear portion shaft 6, an outer flange portion 11b extending in a diameter outward direction from an outer side end of the base portion 11a, and an inner flange portion 11c extending in a diameter outward direction from an inner side end of the base portion 11a.

By this, an inner surface and a circumferential surface of the protruding portion 2h1 are covered by the inner flange portion 11c and the base portion 11a of the bushing 11 respectively, and a vicinity of an edge portion of the support hole 2h on an outer surface is covered by the outer flange portion 11b.

The support hole 2h supports the rear portion shaft 6 which is a tubular shaft member extending in a left and right direction, to be freely rotatable, via this bushing 11.

A hole of the rear portion shaft 6 is closed by fitting a cap 15, and a deformation in a diameter direction is prevented.

An outer diameter $\phi 11b$ of the outer flange portion 11b in the bushing 11 is set to be larger than an outer diameter $\phi 11c$ of the inner flange portion 11c.

An axial direction distance between an inner side surface of the inner flange portion 11c of the bushing 11 and an inner side surface 2b of the side frame 2 is set as a distance L11.

A pair of flange like expanded portions 6a, 6b are formed to be separated in an axial line CL6 direction, at a portion near the side frame 2 on a left side of the rear portion shaft 6.

The flange like expanded portions 6a, 6b are formed as flanges in which the rear portion shaft 6 is compressed in an axial direction and protruded by being folded in tight contact toward an outer side in a diameter direction.

The flange like expanded portions 6a, 6b are formed such that their respective outer diameters $\phi 6a$ and $\phi 6b$ are equal.

Also, a width (thickness) in the axial direction of the flange like expanded portion 6b is set as a thickness L6. The thickness L6 is made to be smaller than the distance L11.

Between the pair of flange like expanded portions 6a, 6b, the sector 7 is pinched and fixed firmly so as to be substantially integrated with the rear portion shaft 6.

Here, the axial direction distance between an outer side surface 7d oriented to an outer side in the axis direction of the sector 7 and an inner side surface 2b of the side frame 2 is set as a distance L7.

Between the sector 7 and the side frame 2, a ring shaped spacer 13 made of resin is installed.

Figure 4:
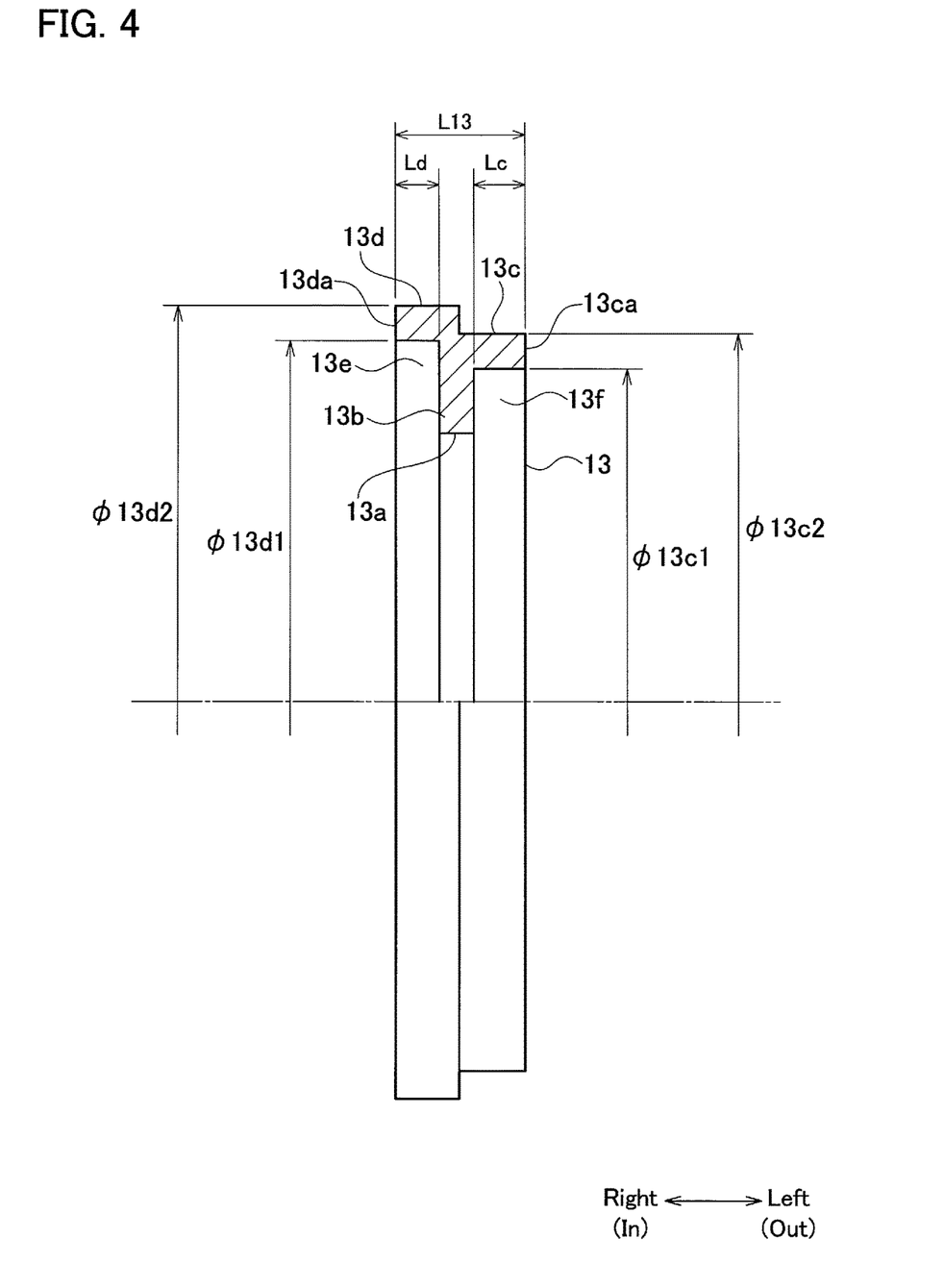
FIG. 4 is a half cross sectional view for explaining a spacer 13 provided on the seat lifter structure LK.

FIG. 4 is a half cross sectional view for explaining a detailed shape of this spacer 13. A left and right (out and in) direction in FIG. 4 is corresponding to an installed posture shown in FIG. 3.

As shown in FIG. 4, the spacer 13 has a ring shaped base portion 13b extended in a diameter direction and having a hole 13a, an outer abutting portion 13c protruding by a distance Lc in ring shape from an outer circumferential portion of the base portion 13b to a left side (outer side), and an inner abutting portion 13d protruding by a distance Ld in ring shape from an outer circumferential portion of the base portion 13b to a right side (inner side).

Here, in a diameter direction, when an inner diameter and an outer diameter of the outer abutting portion 13c are set to be φ13c1 and φ13c2 respectively, and an inner diameter and an outer diameter of the inner abutting portion 13d are set to be φ13d1 and φ13d2 respectively, at least the outer diameter φ13c2 of the outer abutting portion 13c and the outer diameter φ13d2 of the inner abutting portion 13d are set as different outer diameters.

More specifically, in this example, the outer diameter φ13c2 of the outer abutting portion 13c is made to be smaller than the outer diameter φ13d2 of the inner abutting portion 13d.

Also, the inner diameter φ13d1 of the inner abutting portion 13d is set to be larger than the outer diameter φ6b of the flange like expanded portion 6b.

Also, the inner diameter φ13c1 of the outer abutting portion is set to be larger than the outer diameter φ11c of the inner flange portion 11c of the bushing 11.

On the other hand, in an axial direction, an overall thickness of the spacer 13, i.e., the distance L13 in the axial direction between a tip end surface 13da of the inner abutting portion 13d and a tip end surface 13ca of the outer abutting portion 13c, is set to be slightly smaller, with respect to a distance L7 (see FIG. 3) which is an axial direction distance between an outer side surface 7d of the sector 7 and an inner side surface 2b of the side frame 2.

Also, a distance Ld, which is a protruding height of the inner abutting portion 13d, is set to be larger than a thickness L6 (see FIG. 3) of the flange like expanded portion 6b, and a distance Lc, which is a protruding height of the outer abutting portion 13c, is set to be larger than a distance L11 (see FIG. 3), which is the axial direction distance between the inner side surface of the inner flange portion 11c of the bushing 11 and the inner side surface of the side frame 2.

Also, the distance Ld is set to be smaller than the distance Lc, and to be smaller than the distance L11.

Returning to FIG. 3, to an outer side (right side) than the support hole 2h in the rear portion shaft 6, a push ring 12 that functions as a disc spring is attached.

More specifically, in an inner diameter portion of the push ring 12, a plurality of protrusions 12 protruding in a diameter reduction direction and separated in a circumferential direction are formed, and in an outer diameter portion, a curved portion 12b formed to be convex in an inner side so as to abut smoothly without intruding into the outer flange portion 11b of the bushing 11 is formed.

The push ring 12 is a biasing member which exhibits an elastic repulsive force in an axial direction by being pressed into the rear portion shaft 6 with a strong fitting from an outer side, which biases the outer flange portion 11b of the bushing 11 to an inner side (right direction).

The spacer 13 is installed between the sector 7 and the side frame 2, in an orientation in which the inner abutting portion 13d is on the sector 7 side, due to the shape described above and its size relationship.

Moreover, the sector 7 relatively approaches to the side frame 2, due to a reaction force of the elastic repulsive force that biases the outer flange portion 11b of the push ring 12 to an inner side.

Figure 5:
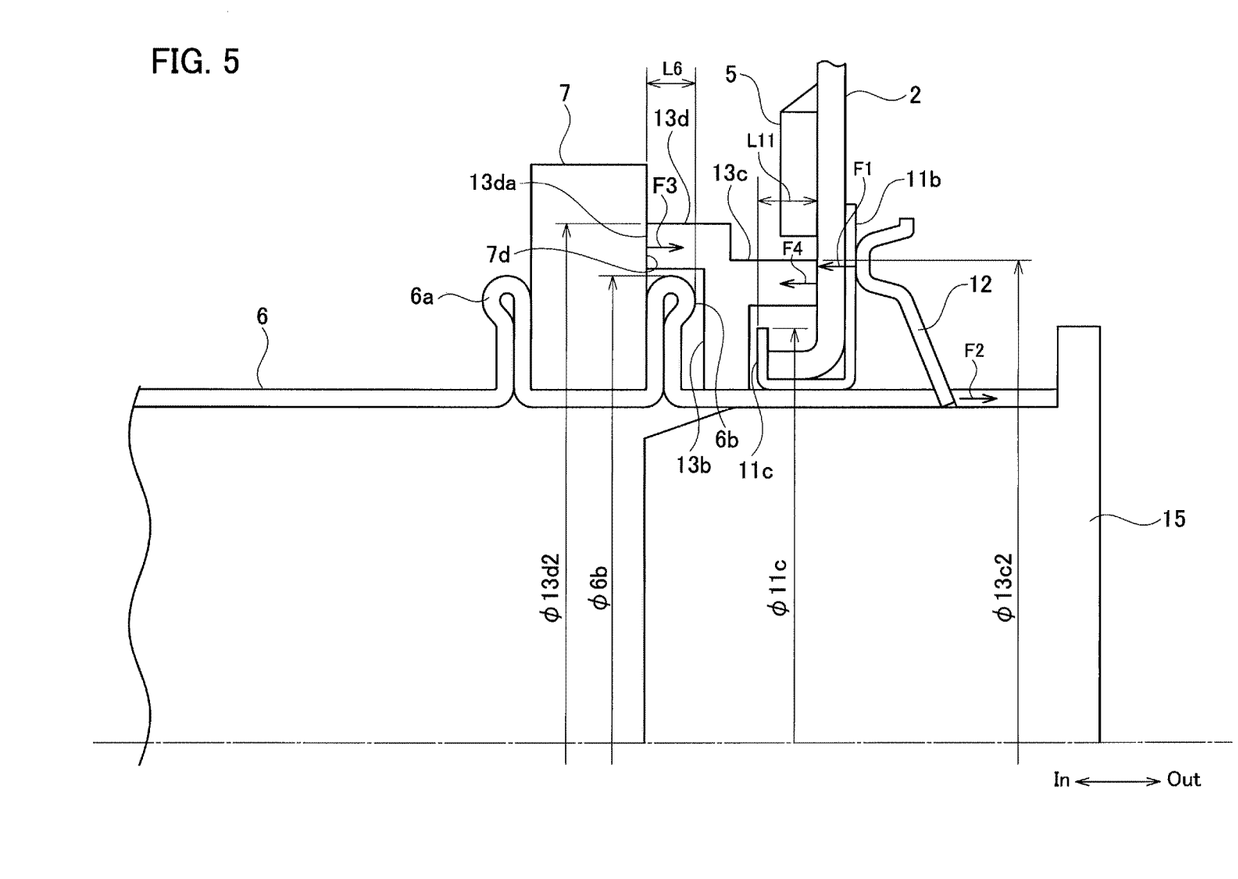
FIG. 5 is a partial enlarged view of FIG. 3 for explaining forces acting on members such as the spacer 13.

FIG. 5 is a partial enlarged view of FIG. 3 for explaining forces acting between the spacer 13 and members in its vicinity. A hatching is removed in order to make it easier to see the figure.

Here, a friction coefficient between the spacer 13 and the sector 7 and a friction coefficient between the spacer 13 and the side frame 2 are both going to be a fiction coefficient between a metal and a resin, which can be regarded as equal without any substantial difference.

As shown in FIG. 5, the spacer 13 has the tip end surface 13ca of the outer abutting portion 13c biased and abutted to the inner side surface 2b of the side frame 2, and the tip end surface 13da of the inner abutting portion 13d biased and abutted to the outer side surface 7d of the sector 7.

When the push ring 12 biases the outer flange portion 11b of the bushing 11 to an inner side by a force F1 with its curved portion 12b, the rear portion shaft 6 is pushed to an outer side by a force F2 of the same magnitude as the force F1 due to its reaction force.

By this, the sector 7 that is integral to the rear portion shaft 6 has its outer side surface 7d biasing the tip end surface 13da of the inner abutting portion 13d of the spacer 13 to an outer side by a force F3 of the same magnitude as the force F2.

The spacer 13 receives a force F4 to an inner side from the side frame 2, at the tip end surface 13ca of the outer abutting portion 13c as a reaction force corresponding to this F3.

Namely, the tip end surface 13ca and the tip end surface 13da will become biasing and abutting surfaces for biasing and abutting to the side frame 2 and the sector 7 respectively.

In a state where the force F3 and the force F4 originating from the elastic force of this push ring 12 are exerted on the spacer 13, a case where the already described lifting operation is carried out and the sector 7 is relatively rotating with respect to the side frame 2 will be considered.

In this case, the outer diameter φ13d2 that is the maximum diameter of the inner abutting portion 13d is larger than the outer diameter φ13c2 that is the maximum diameter of the outer abutting portion 13c, and the force F3 and the force F4 are equal in magnitude, so that a static torque based on a product of the force F3 and a static friction coefficient in the sliding of the sector 7 and the spacer 13 will be greater than a static torque based on a product of the force F4 and a static friction coefficient in the sliding of the spacer 13 and the side frame 2.

Similarly, a dynamic torque based on a product of the force F3 and a dynamic friction coefficient in the sliding of the sector 7 and the spacer 13 will be greater than a dynamic torque based on a product of the force F4 and a dynamic friction coefficient in the sliding of the spacer 13 and the side frame 2.

For this reason, in the case where a relative rotation of the sector 7 with respect to the side frame 2 occurs in the lifting operation, the sliding will occur between the spacer 13 and the side frame 2 on a side with a smaller static torque, and even after the sliding is started, the sliding between the spacer 13 and the side frame 2 with a smaller dynamic torque will continue as it is.

By this, in the seat lifter structure LK, the spacer 13 will always slide with respect to the same member (side frame 2) in the relative rotation of the side frame 2 and the sector 7, so that the rotation of the sector 7 in conjunction with the lifting operation can be carried out with the stable torque.

The seat lifter structure LK is made such that the spacer 13 cannot be installed in a reverse orientation, and this will be explained next.

First or all, the spacer 13 has a shape that is not interfering with the flange like expanded portion 6b of the rear portion shaft 6 and the inner flange portion 11c of the bushing 11, in a proper attachment posture shown in FIG. 3 to FIG. 5.

In detail, the inner diameter φ13c1 of the outer abutting portion 13c and the distance Lc that is the protruding height in the spacer 13 are set to be larger than the outer diameter φ11c of the inner flange portion 11c of the bushing 11 and the distance L11 that is the protruding height from the side frame 2, respectively. Also, the inner diameter φ13d1 of the inner abutting portion 13d and the distance Ld that is the protruding height in the spacer 13 are set to be larger than the outer diameter φ6b of the flange like expanded portion 6b and the thickness L6, respectively.

Moreover, the inner diameter φ13c1 of the inner abutting portion 13d is set to be smaller than the outer diameter φ6b of the flange like expanded portion 6b, and the distance Ld that is the protruding height of the inner abutting portion 13d is set to be smaller than the distance L11 that is the protruding height of the inner flange portion 11c from the side frame 2.

Namely, the spacer 13 has the inner abutting portion 13d in a proper attachment orientation shown in FIG. 3 about the axial line CL6, so that it can be regarded as being equipped with a ring shaped concave portion 13e (see also FIG. 4) into which the flange like expanded portion 6b is capable of entering without abutting to the spacer 13. Also, similarly, it has the outer abutting portion 13c, so that it can be regarded as being equipped with a ring shaped concave portion 13f (see also FIG. 4) into which the inner flange portion 11c of the bushing 11 and the protruding portion 2h1 of the side frame 2 are capable of entering with abutting.

Then, in the case where an attempt to attach the spacer 13 in a reverse orientation in the axial direction is made, it interferes with the flange like expanded portion 6b of the rear portion shaft 6 and the inner flange portion 11c of the bushing 11, and it becomes impossible for the tip end surfaces 13ca and 13da to abut to the sector 7 and the side frame 2 respectively, so that it is made such that the attachment is impossible.

By this, the operation mistake at a time of manufacturing can be prevented, and there is always the sliding between surfaces that are set in advance (the tip end surface 13ca of the outer abutting portion 13c in the spacer 13 and the inner side surface 2b of the side frame 2 in this example), so that the product quality of the vehicle seat is stabilized.

The present invention is not to be limited to the embodiments explained above, and can be modified variously within a range of not digressing from the essence of the present invention.

A surface on which the spacer 13 slides is not to be limited to the inner side surface 2b of the side frame 2 as described above, and may be the outer side surface 7d of the sector 7. In this case, it suffices to set the maximum diameter of the inner abutting portion 13d of the spacer 13 to be smaller than the maximum diameter of the outer abutting portion 13c.

A position of the sector 7 as described above is not to be limited to a left portion of the rear portion shaft 6, and may be on a right portion.

The invention claimed is:

1. A seat lifter structure for raising or lowering a cushion seat by raising or lowering a side frame provided on the cushion seat with respect to a support member, the seat lifter structure comprising:
a sector rotatably supported by said support member, said sector being arranged facing with said side frame by being pinched and fixed by a pair of flange expanded portions formed on a tubular shaft member rotatably supported by said side frame, and said sector rotating around an axial line of said tubular shaft member along said side frame when said side frame is raised and lowered;
a ring-shaped spacer having a first ring-shaped abutting surface facing with said sector and said first ring-shaped abutting surface having a first outer diameter, and a second ring-shaped abutting surface facing with said side frame and said second ring-shaped abutting surface having a second outer diameter different from said first outer diameter, said ring-shaped spacer being installed in a first orientation between said sector and said side frame with an axial line of said tubular shaft member as a central axis; and
a biasing member biasing and abutting said sector to said first abutting surface and biasing and abutting said side frame to said second abutting surface by biasing said sector and said side frame in a direction of approaching.

2. A seat lifter structure in accordance with claim 1, wherein said ring-shaped spacer has a concave portion into which said flange expanded portions are capable of entering without abutting, said flange expanded portions abutting said spacer and said second abutting surface not abutting said sector, in a case of said ring-shaped spacer being installed in a reverse orientation in an axial line direction with respect to said first orientation.

3. A vehicle seat mounted on a vehicle and having a cushion seat and a seat back, the vehicle seat comprising:
a seat lifter structure to be raised or lowered with respect to a movable rail supported on a fixed rail fixed to a floor of said vehicle, said seat lifter structure comprising:
a sector rotatably supported by said movable rail, said sector being arranged facing with said side frame by being pinched and fixed by a pair of flange expanded portions formed on a tubular shaft member rotatably supported by said side frame, and said sector rotating around an axial line of said tubular shaft member along said side frame when said side frame is raised and lowered;
a ring-shaped spacer having a first ring-shaped abutting surface facing with said sector and said ring-shaped abutting surface having a first outer diameter, and a second ring-shaped abutting surface facing with said side frame and said second ring-shaped abutting surface having a second outer diameter different from said first outer diameter, said ring-shaped spacer being installed in a first orientation between said sector and said side frame with an axial line of said tubular shaft member as a central axis; and
a biasing member biasing and abutting said sector to said first abutting surface and biasing and abutting said side frame to said second abutting surface by biasing said sector and said side frame in a direction of approaching.

4. A vehicle seat in accordance with claim 3, wherein said ring-shaped spacer has a concave portion into which said flange expanded portions are capable of entering without abutting, said flange expanded portions abutting said spacer and said second abutting surface not abutting said sector, in a case of said ring-shaped spacer being installed in a reverse orientation in an axial line direction with respect to said first orientation.

* * * * *